Patented June 7, 1932

1,862,511

UNITED STATES PATENT OFFICE

RICHARD PASTERNACK, OF BROOKLYN, AND WILLIAM RALPH GILES, OF RICHMOND HILL, NEW YORK, ASSIGNORS TO CHARLES PFIZER & COMPANY, OF BROOKLYN, NEW YORK, A CORPORATION OF NEW JERSEY

PROCESS FOR THE PREPARATION OF d-GLUCONO-δ-LACTONE

No Drawing.   Application filed March 16, 1931.   Serial No. 523,186.

This invention relates to lactones and more particularly to a process of preparing d-glucono-δ-lactone.

There are two lactones of d-gluconic acid known, one, d-glucono-γ-lactone, having a melting point of 130 to 135° C. and an initial specific rotation $[\alpha]_D = 68.2°$, and a second, d-glucono-δ-lactone, having a melting point of 150 to 152° C. and a rotation, 12 minutes after solution, $[\alpha]_D = 61.7°$.

According to previous knowledge, the isolation of either lactone is difficult. Also, in conversion from gluconic acid, neither lactone has been obtained alone, as formation of the d-glucono δ-lactone is incomplete and accompanied by the formation of d-glucono γ-lactone.

We have now found that it is possible to obtain a complete conversion of d-gluconic acid to its δ-lactone.

When an aqueous gluconic acid solution, as may be obtained, for example, by the decomposition of calcium gluconate by oxalic acid, is concentrated, either by standing in a desiccator over a drying agent, or by evaporation in vacuo, or by evaporation at ordinary pressure, a syrupy substance results, which is a mixture of the free gluconic acid and both its lactones. By means of solvents, such as alcohol, the mixed lactones can be isolated from the syrup in small yields.

We have made the unexpected discovery, that on evaporating of gluconic acid solution to or above 80% strength, then seeding it with d-glucono δ-lactone crystals, and continuing the evaporation at a temperature below 70° C., the sole resulting crystallization product was d-glucono δ-lactone.

Although the crystallization is preferably accomplished by seeding with d-glucono δ-lactone crystals, we do not wish to be limited to only this means, as the crystallization may very well be promoted by seeding with any isomorph of this substance.

Example I

An aqueous solution of gluconic acid, such for instance as obtained by decomposition of calcium gluconate with oxalic acid, or barium gluconate with sulfuric acid, is pre- concentrated in a vacuum still provided with an agitator at subatmospheric pressure until the concentration of gluconic acid has reached a strength of 80 to 85% gluconic acid. This point may be ascertained by titration of a sample or by determination of the specific gravity (42½ Bé. at 60° C.). This preliminary evaporation can be done at any desired temperature below 100° C. It is, however, preferable not to heat at a temperature above 70° C. The crystallization of the d-glucono δ-lactone from the 80 to 85% gluconic acid is then best carried out at a temperature of 40 to 45° C. To this end the preconcentrated liquor is cooled to about 40° C., seeded with d-glucono δ-lactone crystals, or an isomorph of d-glucono δ-lactone, and the evaporation continued at 28.5 to 29 inches of mercury. When about half of the gluconic acid originally present has crystallized as d-glucono δ-lactone, the evaporation is interrupted. The crystallization thus obtained is freed from its mother liquor by centrifugation and washing with cold water, and then dried at a moderate temperature (40 to 60° C.). The product obtained in this manner is a shiny, crystalline powder. It is the pure d-glucono δ-lactone, substantially free of gluconic acid or d-glucono γ-lactone, possessing a melting point of 149 to 151° C. and assaying 99.5 to 100% d-glucono δ-lactone by titration. The mother liquor from the first crystallization is returned to the vacuum still, and after reseeding with d-glucono δ-lactone, evaporated at 28.5 to 29 inches of mercury, until a satisfactory second crystallization is obtained. By continuing these operations, a complete conversion of the original gluconic acid to d-glucono δ-lactone is possible.

Example II

An aqueous solution of gluconic acid is evaporated in a vacuum still to 80 to 85% strength. This preconcentrated solution is then seeded with d-glucono δ-lactone, or an isomorph of d-glucono δ-lactone, crystals and transferred to a shallow pan or shallow pans, which are placed in a vacuum shelf dryer and heated at a temperature of 40 to 60° C. and at 28 to 29 inches of mercury until completely solidified. The solid substance is pure d-glucono δ-lactone. After removing from the pan it may be ground.

The invention claimed is:

1. In the process of preparing d-glucono δ-lactone, the step which comprises seeding aqueous gluconic acid solution of about 80% strength at below about 70° C. with d-glucono δ-lactone crystals to crystallize out additional d-glucono δ-lactone.

2. The process of preparing d-glucono δ-lactone which comprises concentrating an aqueous gluconic acid solution to about 80% concentration at below about 70° C., seeding said solution with d-glucono δ-lactone crystals and recovering the crystallized d-glucono δ-lactone formed.

3. Process of preparing d-glucono δ-lactone which comprises concentrating an aqueous gluconic acid solution to about 80% strength at below about 70° C. seeding said solution with an isomorph of d-glucono δ-lactone crystals, and recovering the crystallized d-glucono δ-lactone formed.

4. The process of preparing d-glucono δ-lactone which comprises concentrating an aqueous gluconic acid solution to about 80% strength below about 70° C., seeding said solution with d-glucono δ-lactone crystals, and continuing the concentration until conversion to d-glucono δ-lactone is effected.

5. The process of preparing d-glucono δ-lactone which comprises concentrating an aqueous solution of gluconic acid to about 80% strength at about 70° C., seeding said solution with an isomorph of d-glucono δ-lactone crystals, and continuing the concentration below 70° C. until crystallization of d-glucono δ-lactone is effected.

6. The process of preparing d-glucono δ-lactone which comprises concentrating an aqueous solution of gluconic acid to about 80% strength at about 70° C., seeding said solution with d-glucono δ-lactone crystals, and continuing the concentration below 45° and in vacuo to effect separation of d-glucono δ-lactone.

7. The process of preparing d-glucono δ-lactone which comprises concentrating an aqueous solution of gluconic acid to about 80% strength below 70° C., seeding said solution with d-glucono δ-lactone crystals, and continuing the concentration between 40 to 45° C. and about 29 inches of mercury to complete the separation of d-glucono δ-lactone.

8. The process of preparing d-glucono δ-lactone which comprises concentrating and agitating an aqueous solution of gluconic acid to about 80% strength below 70° C., seeding said solution with d-glucono δ-lactone crystals, continuing the concentration between 40 to 45° C. and 28.5 to 29 inches of mercury until partial crystallization of the d-glucono-δ-lactone is effected, removing the crystallized d-glucono δ-lactone and reheating the remaining solution in vacuo to continue the separation of the d-glucono δ-lactone.

9. The process of preparing d-glucono δ-lactone which comprises concentrating an aqueous gluconic acid solution to about 80% strength at below about 70° C., seeding said solution with d-glucono δ-lactone crystals, transferring the mixture to a shallow container, and recovering further d-glucono δ-lactone by continued concentration.

10. The process of preparing d-glucono δ-lactone which comprises concentrating an aqueous gluconic acid solution to about 80% strength at below about 70° C., seeding said solution with an isomorph of d-glucono δ-lactone crystals, transferring the mixture to a shallow container and concentrating the mixture in a vacuum to obtain further d-glucono δ-lactone.

11. The process of preparing d-glucono δ-lactone which comprises concentrating an aqueous solution of gluconic acid to about 80% strength below 70° C., seeding said solution with d-glucono δ-lactone crystals, transferring the mixture to shallow containers, and heating the mixture between 40 to 60° C. and between 28 to 29 inches of mercury to complete conversion to d-glucono δ-lactone.

Signed at Brooklyn, in the county of Kings and State of New York this 6th day of March A. D. 1931.

RICHARD PASTERNACK.
WILLIAM RALPH GILES.